(12) United States Patent  (10) Patent No.: US 7,407,191 B2
Urushiyama  (45) Date of Patent: Aug. 5, 2008

(54) VEHICLE BODY STRENGTH CONTROL APPARATUS

(75) Inventor: Yuta Urushiyama, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 437 days.

(21) Appl. No.: 11/135,140

(22) Filed: May 23, 2005

(65) Prior Publication Data

US 2005/0263336 A1  Dec. 1, 2005

(30) Foreign Application Priority Data

May 27, 2004 (JP) .............................. 2004-157695
Apr. 14, 2005 (JP) .............................. 2005-117033

(51) Int. Cl.
*B62D 7/22* (2006.01)
*B62D 21/00* (2006.01)
(52) U.S. Cl. ..................... 280/784; 701/301; 701/36; 180/274; 296/187.03
(58) Field of Classification Search .................... 701/1, 701/29, 36, 301; 180/274; 280/784; 296/187.03
See application file for complete search history.

(56) References Cited

U.S. PATENT DOCUMENTS

| 6,193,303 | B1 | 2/2001 | Urushiyama et al. |
| 2002/0134607 | A1 | 9/2002 | Recknagel |
| 2005/0263336 | A1* | 12/2005 | Urushiyama ................ 180/274 |

FOREIGN PATENT DOCUMENTS

| DE | 101 00 880 A1 | 7/2002 |
| JP | 11-291951 | 10/1999 |
| JP | 2001-504413 | 4/2001 |

OTHER PUBLICATIONS

General principles of combined hardening for wear resistance enhancement; Tushinskv, L.I.; Plokhov, A.V.; Sinigaeva, A.G.; Science and Technology, 2004. KORUS 2004. Proceedings. The 8th Russian-Korean International Symposium on, vol. 3, Jun. 26-Jul. 3, 2004 pp. 181-184 vol. 3; Digital Object Identifier 10.1109/KORUS.2004.1555715.*

(Continued)

*Primary Examiner*—Cuong H. Nguyen
(74) *Attorney, Agent, or Firm*—Rankin, Hill & Clark LLP (57) ABSTRACT

In this vehicle body strength control apparatus, a control unit estimates the collision energy that will be generated when a host vehicle collides or makes contact with another object based on various signals input from an external sensor and from a vehicle quantity of state sensor. At a point in time when it is determined that there is a possibility of a collision or of contact occurring between the host vehicle and another object, or, alternatively, at the point in time when a collision or contact between the host vehicle and another object is actually detected, actuators are driven in a strength mode that corresponds to the strength that it is considered is required by a strength varying device for the previously estimated collision energy to be absorbed.

2 Claims, 9 Drawing Sheets

OTHER PUBLICATIONS

Soft computing based car body deformation and EES determination for car crash analysis systems Rovid, A.; Varkonyi-Koczy, A.R.; M.D.G.; Varlaki, N.; Michelberger, P.; Instrumentation and Measurement Technology Conference, 2004. IMTC 04. Proceedings of the 21st IEEE vol. 3, May 18-20, 2004 pp. 1674-1679 vol. 3.*

Microelectronics and photonics-the future; Suhir, E.; Microelectronics, 2000. Proceedings. 2000 22nd International Conference on, vol. 1, May 14-17, 2000 pp. 3-17 vol. 1; Digital Object Identifier 10.1109/ICMEL.2000.840525.*

Anchoring technology for in situ exploration of small bodies; Steltzner, A.D.; Nasif, A.K.; Aerospace Conference Proceedings, 2000 IEEE vol. 7, Mar. 18-25, 2000 pp. 507-518 vol. 7, Digital Object Identifier 10.1109/AERO.2000.879319.*

Locomotive crashworthiness design modifications study; Tyrell, D.; Severson, K.; Marquis, B.; Martinez, E.; Mayville, R.; Rancatore, R.; Stringfellow, R.; Hammond, R.; Perlman, A.B.; Railroad Conference, 1999. Proceedings of the 1999 ASME/IEEE Joint Apr. 13-15, 1999 pp. 78-87; Digital Object Identifier 10.1109/RRCON.1999.762406.*

Local surface deformation analysis by photothermal method; Bertolotti, M.; Li Voti, R.; Paoloni, S.; Sibilia, C.; Liakhou, G.L.; Lasers and Electro-Optics, 1996. CLEO '96., Summaries of papers presented at the Conference on Jun. 2-7, 1996 pp. 329-330.*

Buff load and crashworthiness requirements for the NJ Transit low-floor light rail vehicle; Canjea, S.; Thornes, C.; Railroad Conference, 1996., Proceedings of the 1996 ASME/IEEE Joint Apr. 30-May 2, 1996 pp. 1-16; Digital Object Identifier 10.1109/RRCON.1996.507954.*

Generalised breakdown models and the integration method for predicting non-standard waveshape impulse strengths; Darveniza, M.; Vlastos, A.E.;Properties and Applications of Dielectric Materials, 1988. Proceedings., Second International Conference on Properties and Applications of Sep. 12-16, 1988 pp. 284-287 vol. 1.*

Development of a passenger rail vehicle crush zone; Mayville, R.; Stringfellow, R.; Rancatore, R.; Johnson, K.; Railroad Conference, 1999. Proceedings of the 1999 ASME/IEEE Joint Apr. 13-15, 1999 pp. 94-101; Digital Object Identifier 10.1109/RRCON.1999.762408.*

Synchrotron radiation damage test of insulating materials in the Tristan MR; Mitsui, H.; Kumazawa, R.; Tanii, T.; Chugun, T.; Ohsawa, Y.; Ozaki, T.; Takayama, K.; Particle Accelerator Conference, 1993., Proceedings of the 1993, May 17-20, 1993 pp. 2205-2207 vol. 3 Digital Object Identifier 10.1109/PAC.1993.309269.*

Crashworthiness design of HSGGT vehicles; Galganski, R.A.; Railroad Conference, 1993., Proceedings of the 1993 IEEE/ASME Joint Apr. 6-8, 1993 pp. 121-130 ; Digital Object Identifier 10.1109/RRCON.1993.292954.*

WO 98/22328, Frontal Structure in a Vehicle, Publication Date: May 28, 1998, (Counterpart of JP 2001-504413).

* cited by examiner

VEHICLE BODY STRENGTH CONTROL APPARATUS

BACKGROUND OF THE INVENTION

1. Field of the Invention

The present invention relates to a vehicle body strength control apparatus that controls the strength of a frame or the like of a vehicle body such that collision energy corresponding to the collision mode and the collision object is suitably absorbed.

Priority is claimed on Japanese Patent Application No. 2004-157695, filed May 27, 2004, and Japanese Patent Application No. 2005-117033, filed Apr. 14, 2005, the contents of which are incorporated herein by reference.

2. Description of Related Art

Conventionally, a body strength control apparatus for controlling the strength of a vehicle body is known that, in order to alter the force resisting a collision load that is received from the front of a vehicle by frames that are aligned in the left-right direction of the vehicle, detects a collision mode using a piezoelectric element or a shape memory alloy as an actuator, or using a movable stiffener or the like, and changes the strength of the frame to correspond to different collision loads (for example, refer to Japanese Unexamined Patent Application, First Publication No. H11-291951). Specifically, in a collision mode in which the collision occurs over an entire front surface of a vehicle (i.e., a full-wrap collision), this apparatus decreases the strength of the frames, while, in a collision mode in which the collision load is concentrated in one frame (i.e., an offset collision), the apparatus increases the strength of the frame.

Moreover, an apparatus is known (for example, refer to Published Japanese Translation No. 2001-504413 of the PCT International Application) that determines whether or not a collision has occurred based on, for example, detection results from an acceleration sensor or the like. When a collision has occurred, in order to accelerate the deformation of the frame, this apparatus damages a portion of a frame so that the strength of the frame is lowered.

However, in the above types of body strength adjusting apparatuses according to the conventional technology, because there is only a short time between the determination of the existence of a collision occurrence or from the result of the detection of the collision mode and a predetermined force opposing a collision load, namely, until the force changes to a collision load, a considerable amount of power is required in order to operate the actuator at high speed, and a rapid response capability is also necessary in the actuator. Because of this, the problem arises that the size of the actuator itself becomes considerable. In addition, because it is essential that the power transfer has low resistance in order to improve the response, in particular, the diameter of the power supply cable is large, and the electrode surface area increases. As a result, the problem also arises that the size of the power battery that supplies power to the actuator is increased.

Moreover, in an apparatus that damages a portion of a frame that relate to the above described conventional technology, when a collision occurs, the strength of the frames is only reduced by a constant predetermined amount, and the problem arises that the strength of the frame cannot be suitably changed in accordance with the extent of the collision and the object of the collision.

SUMMARY OF THE INVENTION

The present invention is conceived in view of the above described circumstances and it is an object thereof to provide a vehicle body strength control apparatus that is able to control the strength of a vehicle body at a suitable timing.

The present invention provides a vehicle body strength control apparatus comprising: a collision energy absorption member that is capable of absorbing collision energy that is input from the outside; a vehicle quantity of state sensor that detects a vehicle quantity of state in accordance with a state of a host vehicle; a collision detecting device that predicts a contact or a collision between an object and the host vehicle, or detects the contact or the collision between the object and the host vehicle, based on a vehicle quantity of state detected by the vehicle quantity of state sensor; a collision energy calculation device that calculates a collision energy that is input into the host vehicle at a time of the contact or of the collision between the object and the host vehicle, based on a vehicle quantity of state detected by the vehicle quantity of state sensor; and a strength altering device that alters the strength of the collision energy absorption member, based on a result of a prediction or a result of a detection by the collision detecting device, and on the collision energy calculated by the collision energy calculation device.

According to the vehicle body strength control apparatus having the above described structure, since the strength of the collision energy absorption member is altered based on the result of a prediction or of a detection by the collision detecting device, and on the collision energy calculated by the collision energy calculation device, accordingly it is possible to prevent the strength of the collision energy absorption member being altered with excessive frequency, while it is also possible for collision energy input from the outside to be absorbed at a suitable timing and at a suitable strength.

The present invention provides a vehicle body strength control apparatus comprising: a collision energy absorption member that is capable of absorbing collision energy that is input from the outside; an object detecting device that detects objects present outside the host vehicle; a collision detecting device that predicts a contact or a collision between an object detected by the object detecting device and the host vehicle, or detects the contact or the collision between the object and the host vehicle; an energy calculation device that calculates input energy that is input into the host vehicle at a time of contact or of a collision between the object detected by the object detecting device and the host vehicle; and a strength altering device that alters the strength of the energy absorption member, based on a result of a prediction or a result of a detection by the collision detecting device, and on the input energy calculated by the energy calculation device.

According to the vehicle body strength control apparatus having the above described structure, since the strength of the collision energy absorption member is altered based on the result of a prediction or of a detection by the collision detecting device, and on the collision energy calculated by the collision energy calculation device, accordingly it is possible to prevent the strength of the collision energy absorption member being altered with excessive frequency, and to detect colliding objects using the object detecting device. As a result, it is possible for collision energy input from the outside to be absorbed at a suitable timing and at a suitable strength.

DETAILED DESCRIPTION OF THE INVENTION

The vehicle body strength control apparatus according to an embodiment of the present invention will now be described with reference made to the attached drawings.

Figure 1:
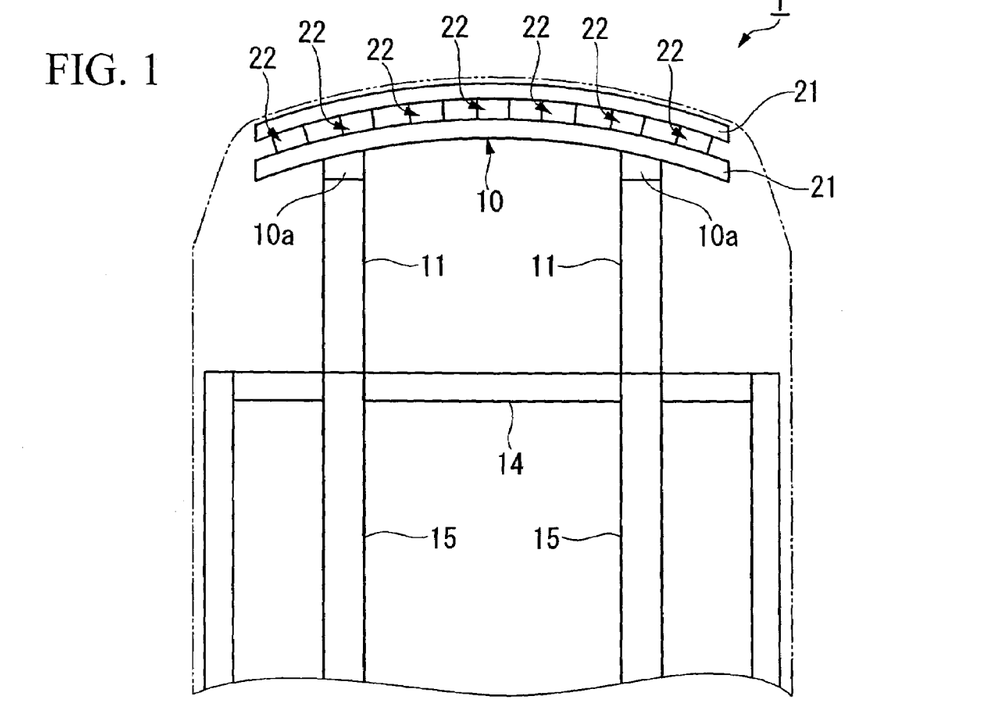
FIG. 1 is a view showing an embodiment of the vehicle body strength control apparatus of the present invention, and is a structural view showing the structure of a front portion of a vehicle body.

The vehicle body strength control apparatus of the present embodiment controls the strength, for example, of a vehicle body beam structure such that this strength can be altered. As is shown in FIG. 1, this vehicle body beam structure is a front bumper beam 10 that is located at a vehicle body front portion 1. In this vehicle body front portion 1, for example, a pair of front side frames 11, which are vehicle body framework members, are provided so as to extend in the vehicle body longitudinal direction and be apart from each other in the vehicle body width direction. Respective distal end portions of this pair of front side frames 11 are joined via connecting members 10a such as brackets to a front bumper beam 10 that extends in the vehicle body width direction. Furthermore, respective base end portions of the front side frames 11 intersect with a dashboard lower cross member 14, which is a vehicle body framework member that extends in the vehicle body width direction, and are joined individually to floor frames 15, which are vehicle body framework members that extend in the vehicle body longitudinal direction.

Figure 2:
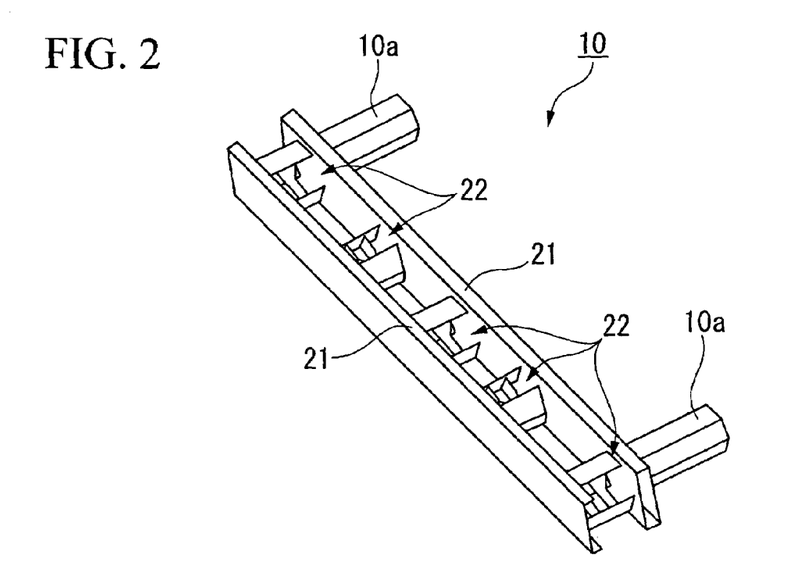
FIG. 2 is a perspective view of a front bumper beam.

As is shown in FIG. 2, the front bumper beam 10 of the present embodiment includes a pair of plate-shaped beam members 21 that are placed so as to face each other and to also extend in the vehicle body longitudinal direction, and a plurality of strength varying devices (i.e., collision energy absorption members) 22 that are connected so as to be sandwiched from both sides in the vehicle body longitudinal direction by the pair of beam members 21.

Figure 3:
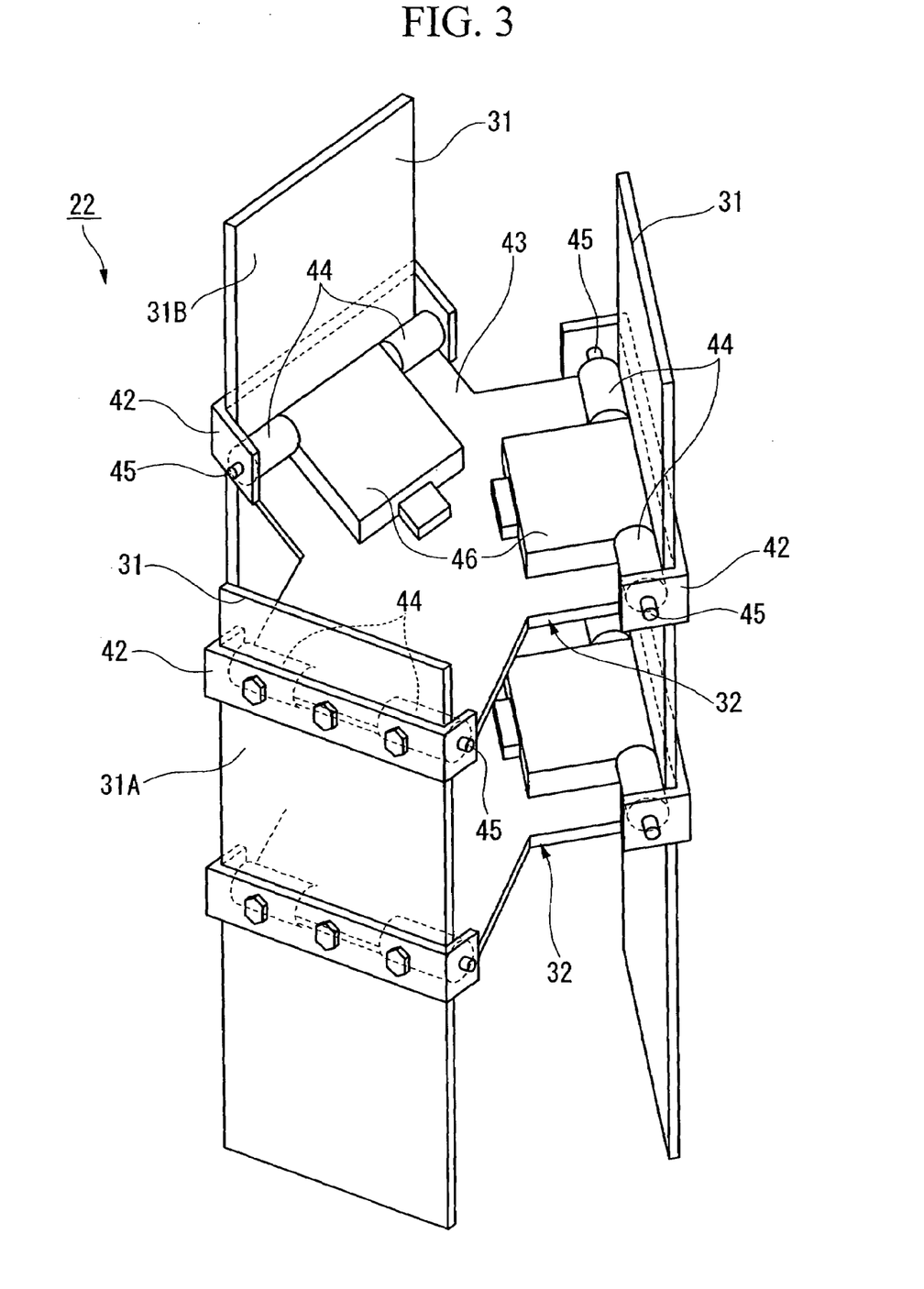
FIG. 3 is a perspective view of a strength varying apparatus.
Figure 4:
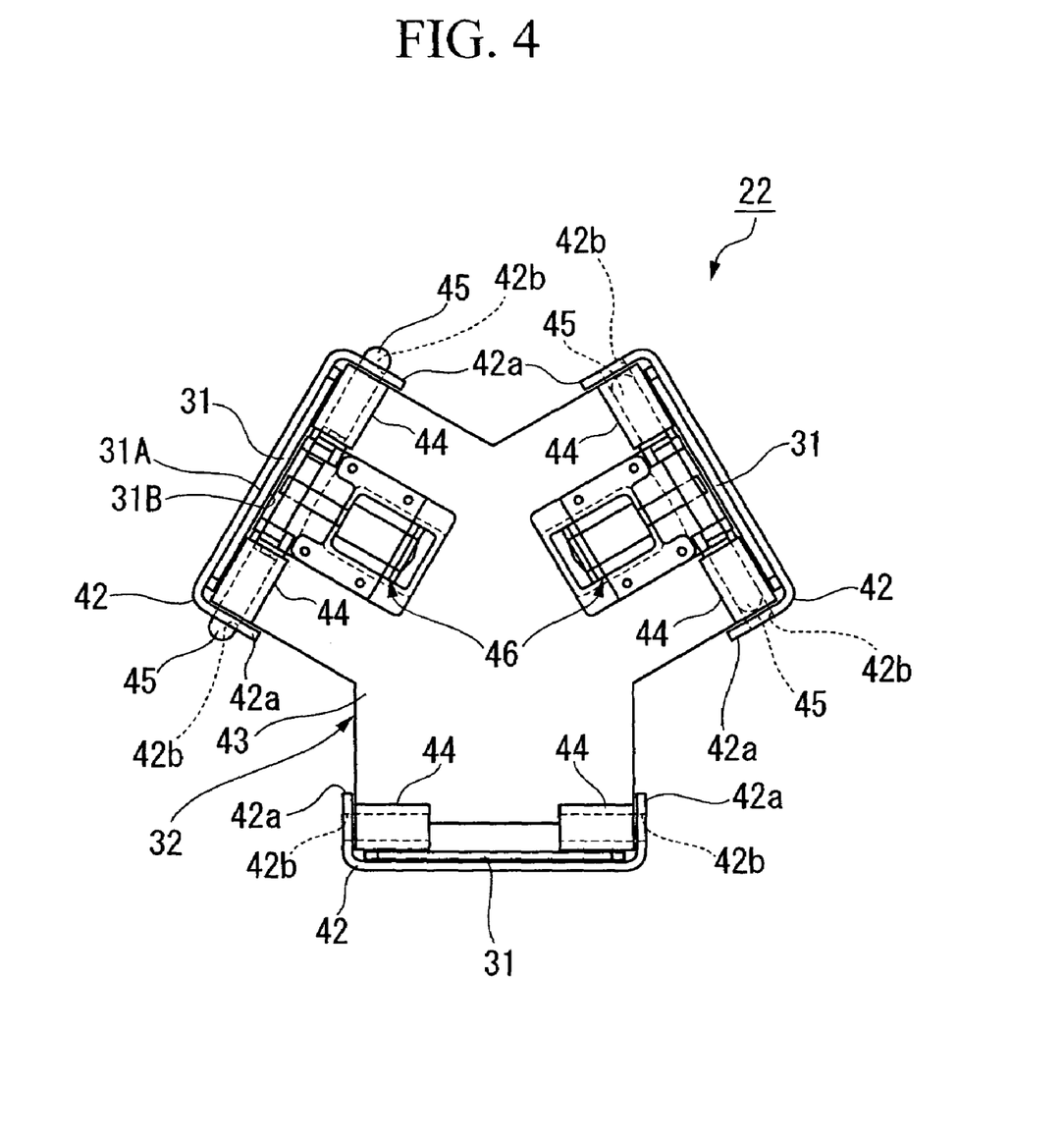
FIG. 4 is a plan view of the strength varying apparatus shown in FIG. 3.

As is shown in FIGS. 3 and 4, the strength varying devices 22 each include a plurality of (for example, three) plate shaped members 31, and a plurality of (for example, two) connecting and separating members 32. The plate-shaped members 31 are formed from a shape memory alloy, and are connected so as to be sandwiched from both sides in the vehicle body longitudinal direction by the pair of beam members 21. The connecting and separating members 32 are connected at predetermined positions in the longitudinal direction of the respective plate-shaped members 31 such that they can be separated from the respective plate-shaped members 31.

The connecting and separating members 32 each include a base member 43, a plurality of pairs of pin guides 44, movable pin members 45, and a plurality of (for example, two) actuators 46. A base member 43 connects the plurality of plate-shaped members 31 such that they are able to be separated, via connecting members 42 that are provided for each one of the plate-shaped members 31. A plurality of pairs of pin guides 44 and movable pin members 45 are provided for each base member 43. Actuators 46 are controlled by a control unit (not shown).

The connecting members 42 that are provided for each plate-shaped member 31 are formed, for example, in the shape of a plate whose two end portions 42a are bent in the same direction. The connecting members 42 are fixed by bolts or the like onto a front surface 31A of the plate-shaped members 31, and the bent two end portions 42a protrude above a rear surface 31B of the plate-shaped members 31. Insertion holes 42b through which the movable pin 45 (described below) can be inserted are formed in each end portion 42a of the connecting members 42.

Figure 5:
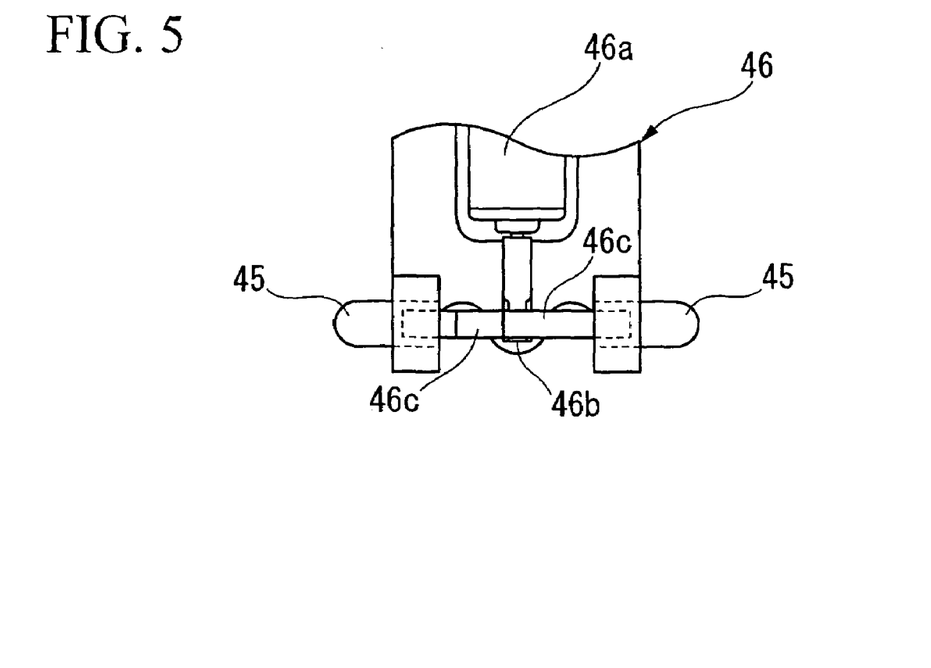
FIG. 5 is a plan view of the actuator shown in FIG. 3.
Figure 6A:
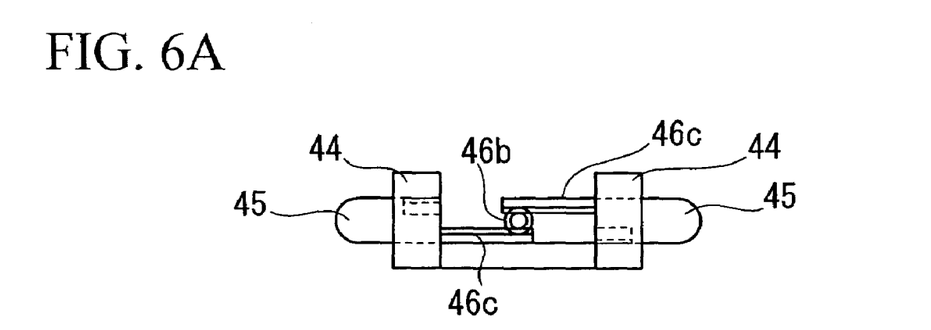
FIGS. 6A and 6B are side views of the actuator shown in FIG. 3.
Figure 6B:
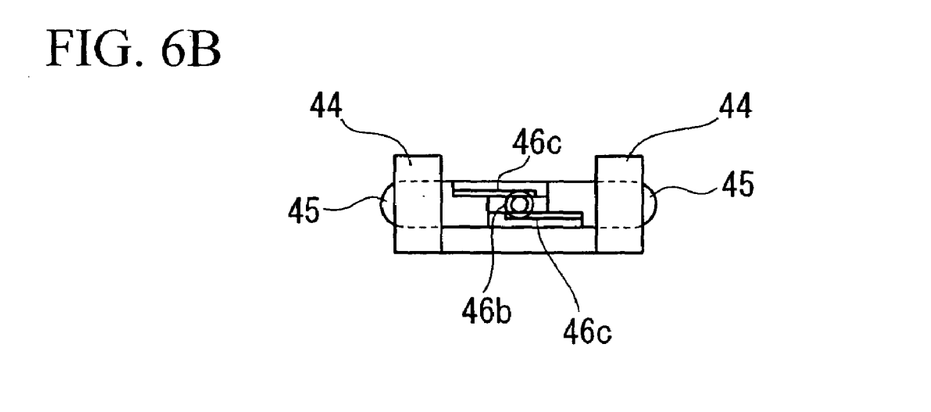

The actuators 46 cause the movable pin members 45 to protrude towards the outside from inside the pin guides 44, as is shown in FIGS. 5 and 6A, or, alternatively, as is shown in FIGS. 5 and 6B, cause the movable pin members 45 to be withdrawn inside the pin guides 44 using, for example, a rack and pinion mechanism. Namely, a pinion 46b that is joined to a rotation shaft of a motor 46a whose driving is controlled by a control unit (not shown) meshes with rack teeth of rack shafts 46c, so that rotational motion that is input from the motor 46a is converted into a reciprocating motion of the rack shafts 46c via the pinion 46b, and the movable pin members 45 that are connected to an end of each rack shaft 46c are made to move forward or backward along the pin guides 44.

By moving the pair of movable pin members 45 that are provided on the base member 43 forward and backward along the pair of pin guides 44 using the actuator 46, the pair of movable pin members 45 are inserted inside the pair of insertion holes 42b or, alternatively, are withdrawn from inside the insertion holes 42b of the connecting member 42 that is provided for the plate-shaped member 31. When the pair of movable pin members 45 are inserted inside the pair of insertion holes 42b, the plate-shaped member 31 and the base member 43 are connected and fixed. When the pair of movable pin members 45 are withdrawn from inside the pair of insertion holes 42b, the plate-shaped member 31 and the base member 43 are separated.

In addition, because a plurality of (for example, two) connecting and separating members 32 are provided for each plate-shaped member 31, the deformation state of each plate-shaped member 31 at a time when a load that is aligned in the longitudinal direction is acting on each plate-shaped member 31 changes in accordance with the combination of fixed and separated states of each connecting and separating member 32.

Figure 7A:
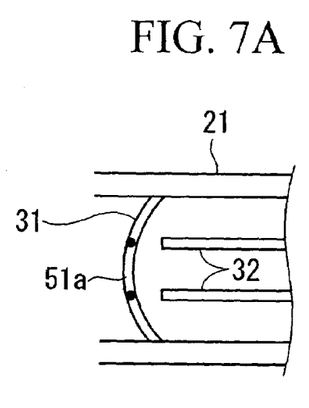
FIGS. 7A, 7B, and 7C are typical views showing a cross section of the plate-shaped member shown in FIG. 3.
Figure 7B:
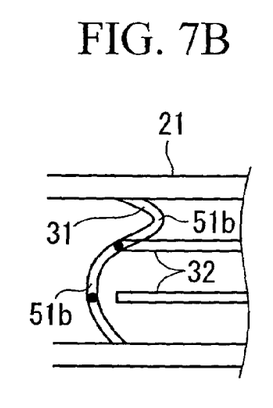
Figure 7C:
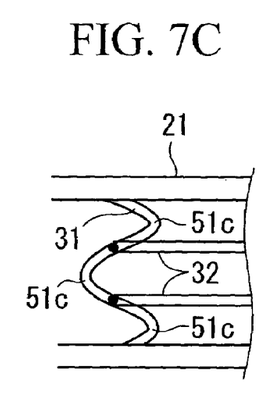

As is shown in FIG. 7A, if the two connecting and separating members 32 are both separated from the plate-shaped member 31, then the strength in the longitudinal direction of the plate-shaped member 31 is reduced to a minimum, and a primary deformation mode is formed in which the plate-shaped member 31 is buckled so as to form a single bulge 51a. As is shown in FIG. 7B, if either one of the two connecting and separating members 32 is connected to a plate-shaped member 31 while the other one is separated from the plate-shaped member 31, then the strength in the longitudinal direction of the plate-shaped member 31 is increased relatively, and a secondary deformation mode is formed in which the plate-shaped member 31 is buckled so as to form two bulges 51b. As is shown in FIG. 7C, if the two connecting and separating members 32 are both connected to a plate-shaped member 31, then the strength in the longitudinal direction of the plate-shaped member 31 is increased to a maximum, and a tertiary deformation mode is formed in which the plate-shaped member 31 is buckled so as to form three bulges 51c.

Figure 8:
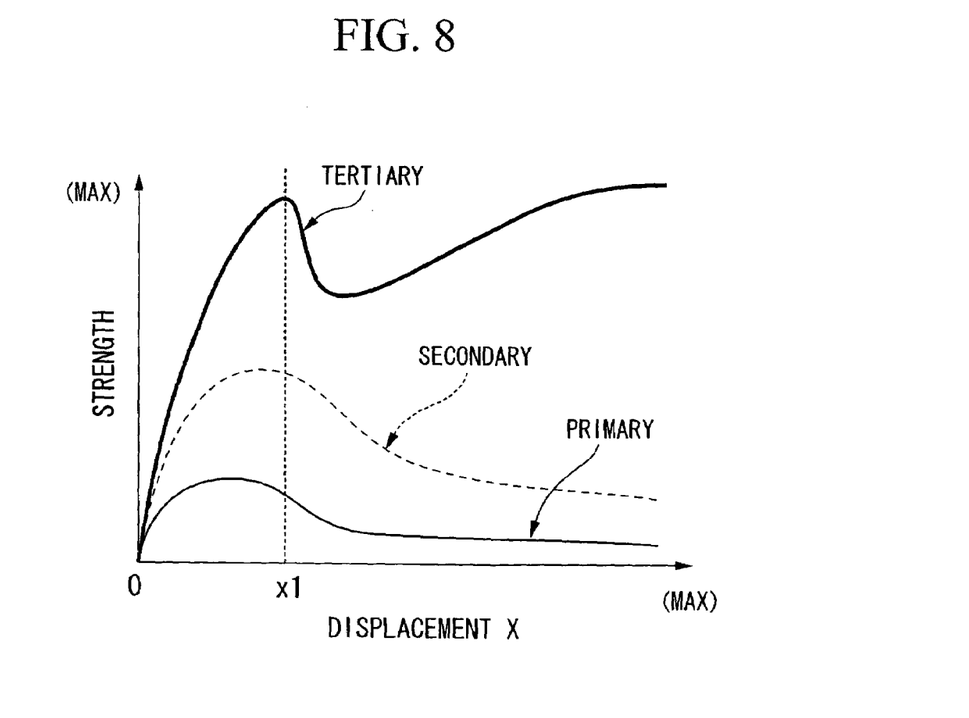
FIG. 8 is a graph showing an example of changes in potential that correspond to the load of the plate-shaped member shown in FIG. 3.

When the two connecting and separating members 32 are both connected to a plate-shaped member 31 which is formed from a shape memory alloy, so that the plate-shaped member 31 is buckled in the tertiary deformation mode, then, as is shown in FIG. 8, after the buckling occurs (for example, in a region where the displacement is greater than a predetermined displacement x1), the strength is temporarily reduced and then changes so as to gradually increase as the displacement increases.

Figure 9:
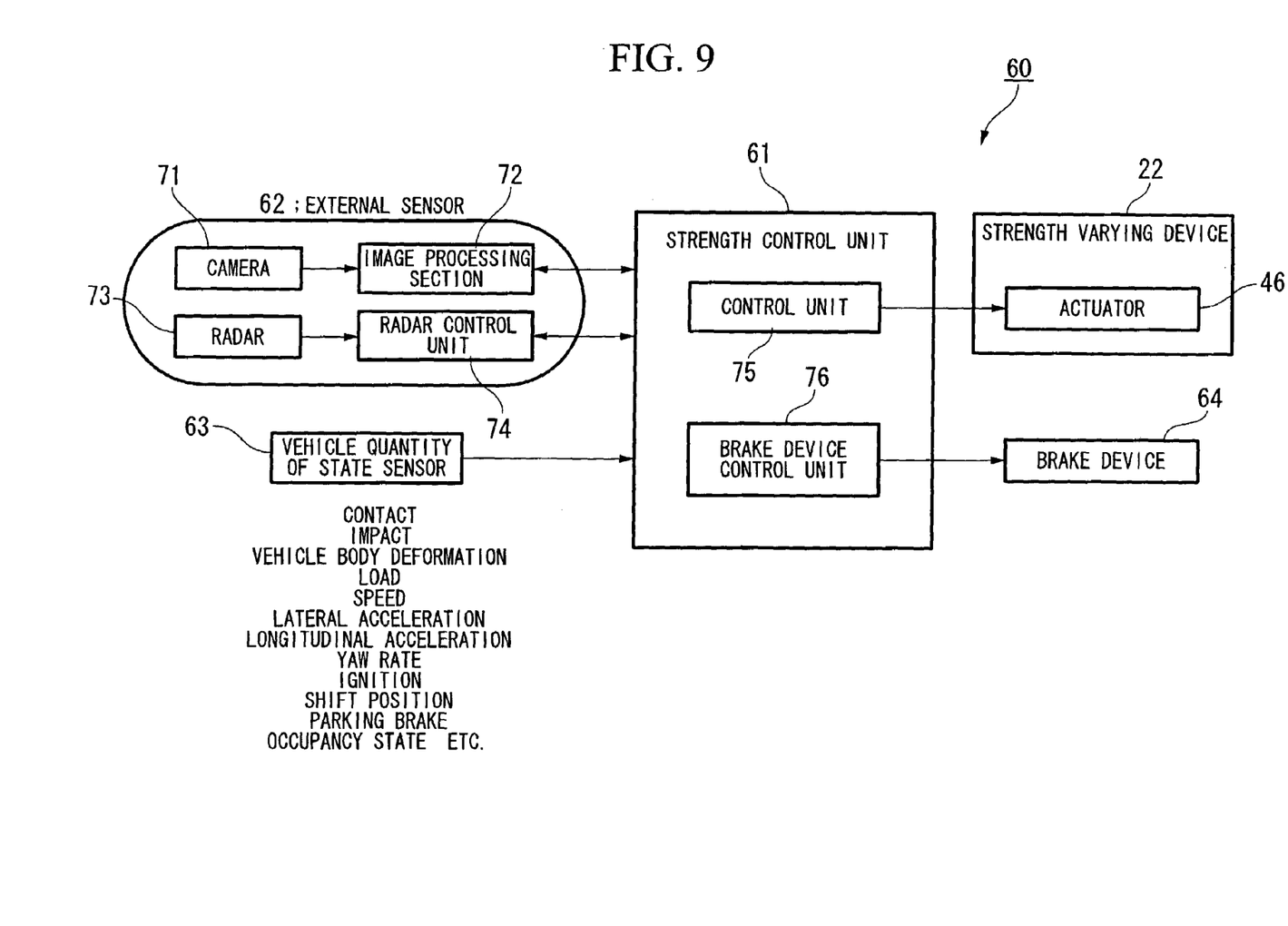
FIG. 9 is a structural view of the vehicle body strength control apparatus according to the present embodiment.

As is shown in FIG. 9, the vehicle body strength control apparatus 60 of the present embodiment includes a strength control unit 61 that is formed by an electronic circuit that includes, for example, a CPU or the like, an external sensor 62, a vehicle quantity of state sensor (i.e., a collision detecting device) 63, the strength varying devices 22, and a brake device 64.

The external sensor 62 is positioned in the vicinity of the nose portion of the body of the host vehicle or in the vicinity of the windshield or the like in the vehicle interior, and, for example, may include a camera 71, an image processing section 72, a radar unit 73, and a radar unit control unit 74.

The camera 71 may be, for example, a CCD camera or C-MOS camera or the like that is able to pick up images in the visible light region or infrared light region, and, in accordance with a control command input from the strength control unit 61, picks up an image of the outside in a suitable detection direction such as the direction in which the vehicle is traveling.

The image processing section 72 performs image processing on images output from the camera 71, and detects, for example, moving objects such as other vehicles or pedestrians, as well as obstacles, road signs, and the like in the vicinity of the host vehicle. Results from these detections as well as, for example, the relative distance from the host vehicle to each recognized object and the relative speed and the direction of movement thereof are calculated, and the results of these calculations are output to the strength control unit 61.

The radar unit 73 may be placed, for example, in the vicinity of the nose portion of the body of the host vehicle or in the vicinity of the windshield or the like in the vehicle interior. The radar unit 73 generates transmission signals such as lasers or millimeter waves in a suitable detection direction in accordance with a control command that is input from the strength control unit 61, and also receives reflected signals that are generated as a result of the transmission signals being reflected by objects (i.e., objects of detection) outside the host vehicle. The reflected signals and transmission signals are then mixed together and a beat signal is generated. This beat signal is then output to the radar unit control unit 74.

The radar unit control unit 74 generates transmission signals in a suitable detection direction from the radar unit 73 in accordance with a control command that is input from the strength control unit 61. Furthermore, based on the frequency f (i.e., the beat frequency) of the beat signals output from the radar unit 73, the radar unit control unit 74 also calculates the relative distance to detected objects inside a predetermined detection area as well as the relative speed and the movement trajectory (or movement direction) thereof, and outputs the results of these calculations to the strength control unit 61.

Note that it is not absolutely essential that both the camera 71 and image processing section 72 be provided, and that both the radar unit 73 and radar unit control unit 74 be provided, and either one of them may be provided. Moreover, if both are provided, then it is possible to combine the processing results of both when detecting moving objects such as other vehicles or pedestrians, as well as obstacles, road signs, and the like in the vicinity of the host vehicle, and to then calculate the relative distance from the host vehicle to each recognized object and the relative speed and the direction of movement thereof, and to then output the results of these calculations to the strength control unit 61.

The vehicle quantity of state sensor 63 includes various sensors that detect the vehicle quantity of state of the host vehicle such as, for example, a contact sensor, an impact sensor, a vehicle body deformation sensor, a load sensor, a vehicle speed sensor, a lateral acceleration sensor, a longitudinal acceleration sensor, a yaw rate sensor, sensors that detect various operating states such as, for example, the state of the ignition switch, the shift position, and the state of the parking brake, and a seating sensor that detects the presence of a vehicle occupant. Detection signals that are output from each of the sensors are output to the strength control unit 61.

The brake device 64 suppresses the occurrence of rapid changes in the behavior of the host vehicle due to the control of the strength control unit 61. The brake device 64, for example, prevents slipping of a drive wheel on a slippery road surface or the like, suppresses the occurrence of side slipping such as oversteer or understeer (i.e., performs a travel behavior stabilizing operation), and prevents the drive wheel from becoming locked during braking (i.e., performs an antilock braking operation), and ensures a desired driving force and steering performance from the host vehicle so that the attitude of the host vehicle is stabilized. Furthermore, the brake device 64 supplements traveling that is caused by creep force, and, for example, prevents backward movement on a sloping road when the internal combustion engine is stopped. Moreover, the brake device 46 causes braking force to come into effect such that the impact is reduced when the host vehicle collides with or makes contact with another object (i.e., performs an impact reducing braking operation).

The strength control unit 61 includes, for example, a control unit 75 and a brake device control unit 76.

As is described below, the control unit 75 sets the strength of the strength varying devices 22 based on the respective signals input from the external sensor 62 and the vehicle quantity of state sensor 63. Control signals for controlling the strength to the set strength are output to the actuators 46 of the strength varying device 22.

The brake device control unit 76 controls the brake device 64 based on the respective signals that are input from the external sensor 62 and the vehicle quantity of state sensor 63.

The vehicle body strength control apparatus 60 of the present embodiment has the above described structure. Next, an operation of this vehicle body strength control apparatus 60 will be described.

The vehicle body strength control apparatus 60 of the present embodiment causes systems to operate when an ignition switch is turned on.

Figure 10:
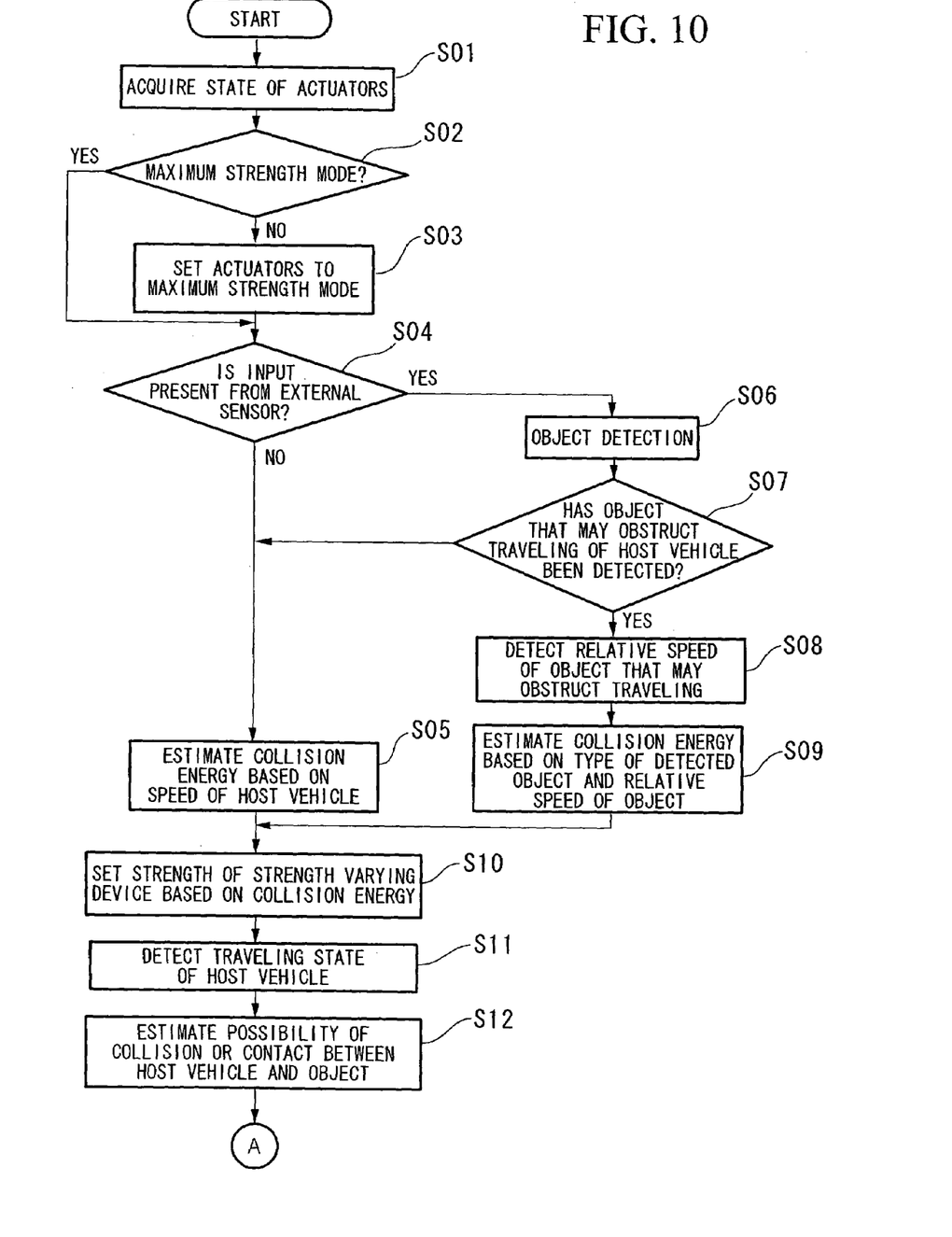
FIG. 10 is a flowchart showing an operation of the vehicle body strength control apparatus shown in FIG. 9.

Firstly, in step S01 shown in FIG. 10, an operating state is acquired for the actuators 46 of each strength varying device 22. The operating state of each actuator 46 is obtained from information relating to the state of connection or separation of each connecting and separating member 32 relative to the plate-shaped members 31 in accordance with the positions of the movable pin members 45 that are moved forwards or backward by the rotation force of each of the motor 46a, namely, from information relating to the strength of the strength varying devices 22.

In step S02, it is determined whether or not the acquired operating state of the actuators 46 is in the maximum strength mode that corresponds to the state when the strength of the strength varying devices 22 is at the maximum.

If the result of this determination is YES, the routine moves to step S04 (described below).

If, however, the result of this determination is NO, the routine moves to step S03.

In step S03, drive control is performed such that the operating state of the actuators 46 changes to maximum strength mode. As a result of this, the regular operating state of the actuators 46, which includes a state in which the ignition is off and the vehicle is stopped, changes to the maximum strength mode in which the strength of the strength varying devices 22 is at the maximum.

Next, in step S04, it is determined whether or not a detection signal has been input from the external sensor 62.

If the result of this determination is NO, the routine moves to step S05 (i.e., a collision energy calculation device). In this step S05, the collision energy generated if the host vehicle were to collide with or make contact with another object is estimated, based on the speed of the host vehicle (i.e., on the vehicle speed) that is detected by the vehicle speed sensor of the vehicle quantity of state sensor 63, and the routine moves to step S10 (described below).

If, however, the result of the determination is YES, the routine moves to step S06.

In step S06, other objects that exist outside the host vehicle are detected based on detected signals that are input from the external sensor 62, and the type of each of the other objects is determined.

Next, in step S07, it is determined whether or not an object that has the potential to obstruct the traveling of the host vehicle is present among these detected objects.

If the result of this determination is NO, the routine moves to the aforementioned step S05.

If, however, the result of the determination is YES, the routine moves to step S08.

In step S08, the relative speed of an object (i.e., the difference between the speed of the host vehicle and the speed of the object) that may present an obstacle to the traveling of the host vehicle is detected.

Next, in step S09 (i.e., a collision energy calculation device), the collision energy generated if the host vehicle were to collide with or make contact with another object is estimated, based on the type of the detected object and on the relative speed of the detected object, and the routine moves to step S10.

In step S10, based on the estimated collision energy, a strength is calculated for the strength varying devices 22 that will be required for this collision energy to be suitably absorbed.

Next, in step S11, based on detected signals output from the vehicle quantity of state sensor 63, for example, the vehicle speed, the lateral acceleration, the longitudinal acceleration, the yaw rate, and the like, the traveling state in accordance with the traveling behavior of the host vehicle is detected.

Next, in step S12 (i.e., a collision detection device), based on the detected traveling state of the host vehicle, the possibility of a collision or of contact occurring between the host vehicle and another object or between the host vehicle and an object that may present an obstacle to the traveling of the host vehicle that has been detected by the external sensor 62 is calculated.

Figure 11:
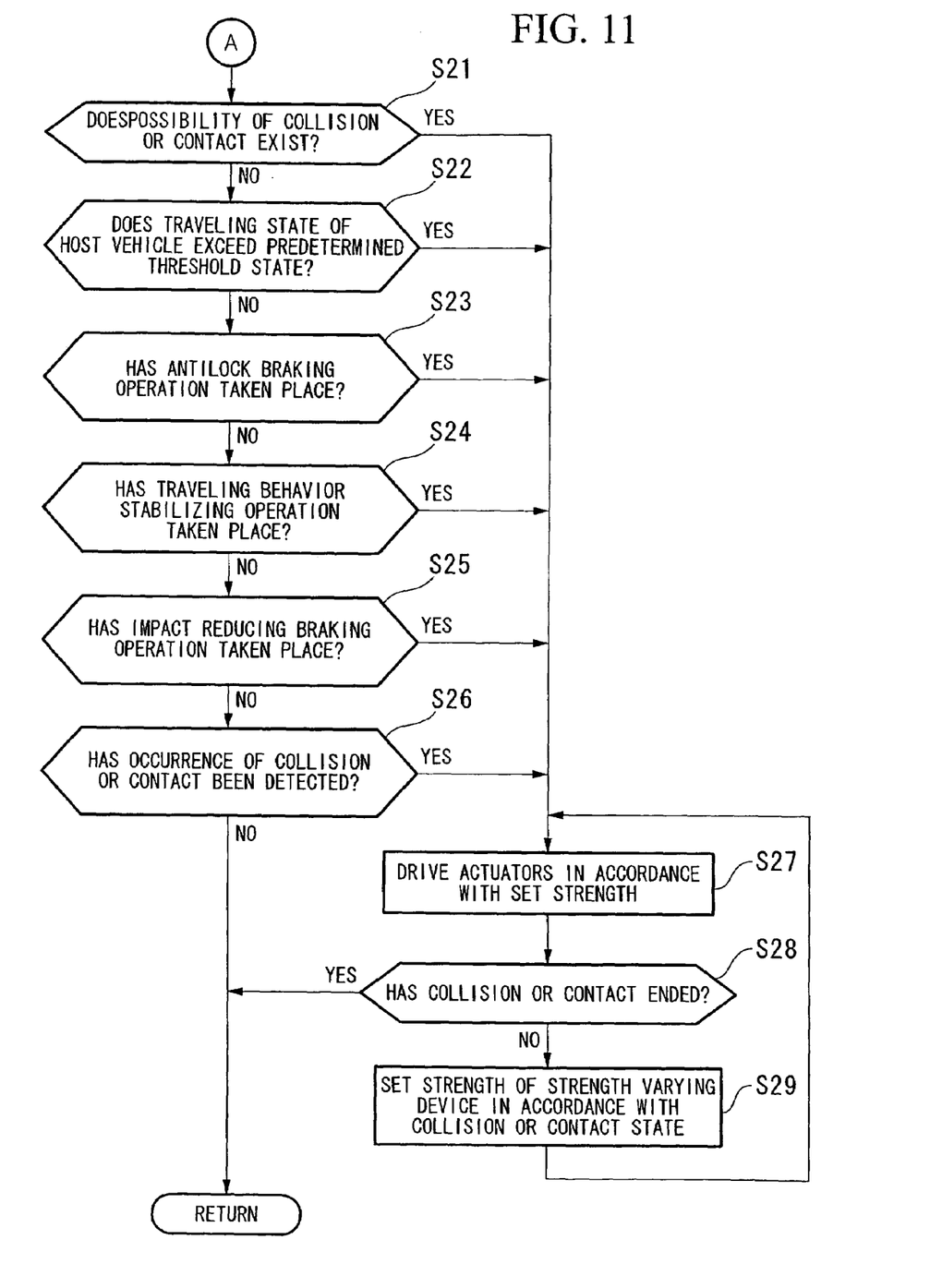
FIG. 11 is a flowchart showing an operation of the vehicle body strength control apparatus shown in FIG. 9.

Next, in step S21 shown in FIG. 11, it is determined whether or not a possibility exists that a collision or contact may occur.

If the result of this determination is YES, the routine moves to step S27 (i.e., a strength varying device) (described below).

If, however, the result of this determination is NO, the routine moves to step S22.

Next, in step S22, it is determined whether or not the detected traveling state of the vehicle exceeds a predetermined threshold state, for example, enters a state of excessive deceleration.

If the result of the determination in step S22 is YES, the routine moves to step S27 (described below).

If, however, the result of this determination is NO, the routine moves to step S23.

Next, in step S23, it is determined whether or not an antilock braking operation has taken place.

If the result of this determination is YES, the routine moves to step S27 (described below).

If, however, the result of the determination is NO, the routine moves to step S24.

Next, in step S24, it is determined whether or not a traveling behavior stabilizing operation has taken place.

If the result of the determination in step S24 is YES, the routine moves to step S27 (described below).

If, however, the result of this determination is NO, the routine moves to step S25.

Next, in step S25, it is determined whether or not an impact reduction braking operation has taken place.

If the result of this determination is YES, the routine moves to step S27.

If, however, the result of this determination is NO, the routine moves to step S26.

Next, in step S26, it is determined whether or not a collision or contact has been detected, based on detected signals output from the vehicle quantity of state sensor 63, for example, contact with another vehicle, an impact, a load, or a vehicle body deformation that affects the host vehicle.

If the result of the determination in step S26 is YES, the routine moves to step S27.

If, however, the result of this determination is NO, the processing series is ended.

In step S27, the actuators 46 are driven in a strength mode that corresponds to the calculated strength of the strength varying devices 22.

Next, in step S28, it is determined whether or not the collision or contact has ended.

If the result of this determination is YES, the processing series is ended.

If, however, the result of this determination is NO, the routine moves to step S29.

In step S29, based on detected signals output from the vehicle quantity of state sensor 63, for example, an impact, a load, or a vehicle body deformation that affects the host vehicle, the strength required by the strength varying devices 22 is recalculated, and the routine returns to step S27.

As is described above, according to the vehicle body strength control apparatus 60 of the present embodiment, at the point in time when it is determined that there is a possibility that a collision or contact will occur between the host vehicle and another object, or, alternatively, at the point in time when a collision or contact between the host vehicle and another object is actually detected, the actuators 46 are driven in a strength mode that corresponds to the strength that is required in the strength varying devices 22 in order for the collision energy previously estimated to be absorbed. As a result, it is possible, for example, to prevent wearing or breakage of the respective members that is caused by the actuators 46 being driven with excessive frequency, and collision energy that is input from the outside can be absorbed at a suitable timing and with a suitable strength.

Moreover, during a period in which a collision or shock has occurred, the strength of the strength varying devices 22 is altered based on detected signals that are output from the vehicle quantity of state sensor 63. Therefore, the actuators 46 can be driven more appropriately as well as efficiently.

Figure 12:
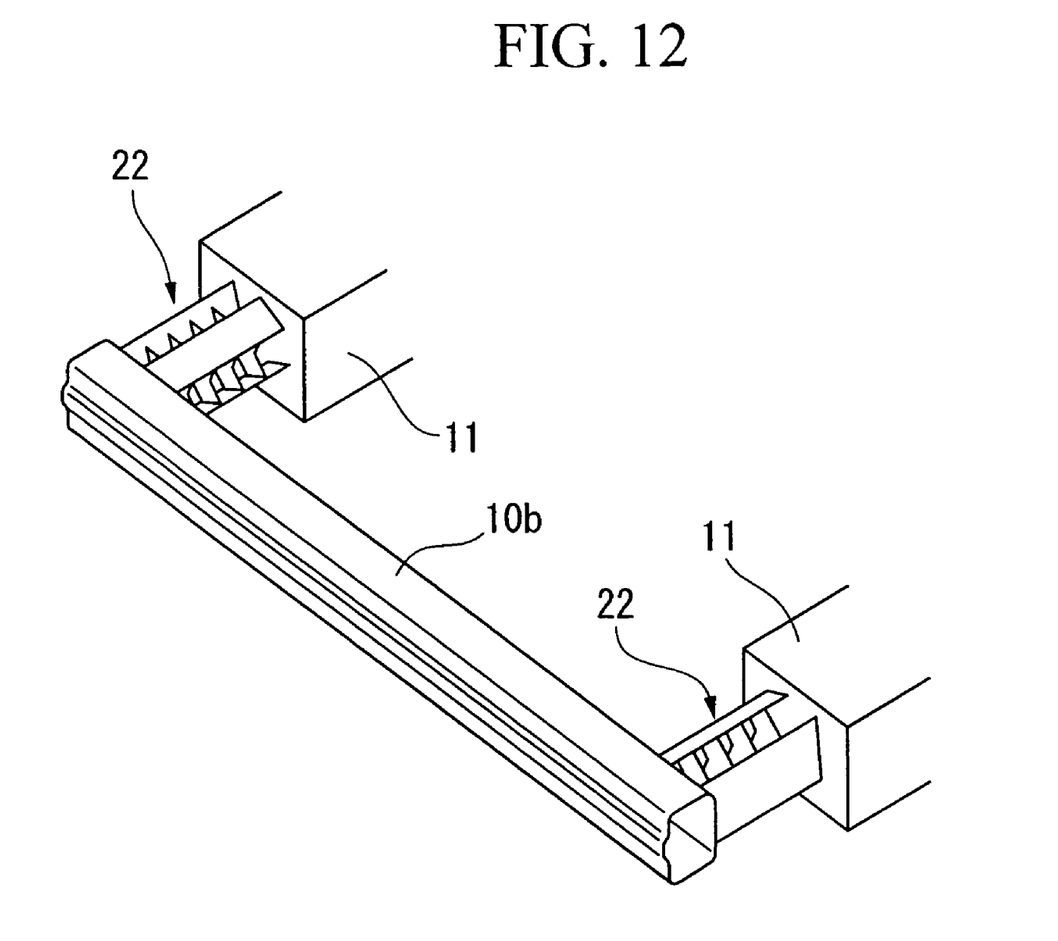
FIG. 12 is a perspective view of a front bumper beam according to a variant example of the present embodiment.

Note that, in the present embodiment, a plurality of strength varying devices 22 are sandwiched from both sides in the vehicle body longitudinal direction by a pair of beam members 21, however, the present invention is not limited to this, and, as is shown in FIG. 12, it is also possible to provide the strength varying devices 22 in the form of connecting members that connect a hollow, cylindrically-shaped front bumper beam body 10b with a pair of front side frames 11. In this case, the two end portions of each plate-shaped member 31 are connected to the front bumper beam body 10b and a front side frame 11. Furthermore, in the above described present embodiment, the connecting members 10a may also be formed as strength varying devices 22.

Moreover, strength varying devices 22 may also be provided in other locations in the vehicle body structure. For example, they may be provided at the interior or exterior of a rear bumper beam that runs in the vehicle body width direction so as to absorb the collision energy generated by a rear collision. They may also be provided inside a side sill that runs in the vehicle body longitudinal direction so as to absorb the collision energy generated by a side collision, and may be provided inside a pillar that runs in a vertical direction so as to absorb the collision energy generated by a side collision.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A vehicle body strength control apparatus comprising:
a collision energy absorption member that is capable of absorbing collision energy that is input from the outside;
a vehicle quantity of state sensor that detects a vehicle quantity of state in accordance with a state of a host vehicle;
a collision detecting device that predicts a contact or a collision between an object and the host vehicle, or detects the contact or the collision between the object and the host vehicle, based on a vehicle quantity of state detected by the vehicle quantity of state sensor;
a collision energy calculation device that calulates a collision energy that is input into the host vehicle at a time of the contact or of the collision between the object and the host vehicle, based on a vehicle quantity of state detected by the vehicle quantity of state sensor; and
a strength altering device that alters the strength of the collision energy absorption member, based on a result of a prediction or a result of a detection by the collision detecting device, and on the collision energy calculated by the collision energy calculation device.

2. A vehicle body strength control apparatus comprising:
a collision energy absorption member that is capable of absorbing collision energy that is input from the outside;
an object detecting device that detects objects present outside the host vehicle;
a collision detecting device that predicts a contact or a collision between an object detected by the object detecting device and the host vehicle, or detects the contact or the collision between the object and the host vehicle;
an energy calculation device that calculates input energy that is input into the host vehicle at a time of contact or of a collision between the object detected by the object detecting device and the host vehicle; and
a strength altering device that alters the strength of the energy absorption member, based on a result of a prediction or a result of a detection by the collision detecting device, and on the input energy calculated by the energy calculation device.

* * * * *